US006926456B1

(12) United States Patent
Jendick

(10) Patent No.: US 6,926,456 B1
(45) Date of Patent: *Aug. 9, 2005

(54) GUIDING DEVICE FOR A MARKING ARRANGEMENT

(75) Inventor: Manfred Jendick, Recklinghausen (DE)

(73) Assignee: Rexam AB, Malmo (SE)

( * ) Notice: Subject to any disclaimer, the term of this patent is extended or adjusted under 35 U.S.C. 154(b) by 938 days.

This patent is subject to a terminal disclaimer.

(21) Appl. No.: 09/723,331

(22) Filed: Nov. 28, 2000

Related U.S. Application Data

(60) Provisional application No. 60/176,925, filed on Jan. 20, 2000.

(51) Int. Cl.[7] ............................. B23K 26/08; B44B 7/00
(52) U.S. Cl. ................................................... 400/611
(58) Field of Search ................... 226/196.1; 400/611, 400/613, 613.1, 613.2, 614, 617, 618, 619

(56) References Cited

U.S. PATENT DOCUMENTS

| | | | |
|---|---|---|---|
| 2,641,998 A | 6/1953 | Donald | 101/235 |
| 2,648,278 A | 8/1953 | Neander | 101/92 |
| 3,001,787 A | 9/1961 | Socke | 271/240 |
| 3,087,665 A * | 4/1963 | Thomas | 226/190 |
| 3,182,994 A | 5/1965 | Huth | 271/240 |
| 3,549,733 A | 12/1970 | Caddell | 264/400 |
| 3,626,141 A | 12/1971 | Daly | 219/121.68 |
| 3,692,223 A | 9/1972 | Laigle et al. | 242/615.3 |
| 3,704,614 A * | 12/1972 | Keyser | 72/165 |
| 3,854,647 A | 12/1974 | Mittendorf | 242/615.3 |
| 3,863,823 A | 2/1975 | Allred | 226/142 |
| 3,898,417 A | 8/1975 | Atkinson | |
| 4,304,981 A | 12/1981 | Gappa | 219/121.66 |
| 4,322,016 A | 3/1982 | Barrash | 220/270 |
| 4,323,755 A | 4/1982 | Nierenberg | 219/121.69 |

(Continued)

FOREIGN PATENT DOCUMENTS

| | | |
|---|---|---|
| CA | 2168435 | 2/1995 |
| DE | 2052 512 | 4/1972 |

(Continued)

OTHER PUBLICATIONS

Machine translation of JP 7–53099 to Komatsu from Japanese Patent Office website.*
JP 07004675, Patent Abstracts of Japan (CD–ROM), Unexamined Applications, vol. 95, No. 1.
JP 07045111, Patent Abstracts of Japan (CD–ROM), Unexamined Applications, vol. 95, No. 2.
JP 04091875, Patent Abstracts of Japan, Abstract of DE 4106151.

(Continued)

*Primary Examiner*—Daniel J. Colilla
(74) *Attorney, Agent, or Firm*—Nixon & Vanderhye P.C.

(57) ABSTRACT

A device for guiding a continuous strip past a marking unit, which is arranged to non-mechanically provide markings on at least one strip surface, includes a longitudinal channel for receiving the strip. The channel is at least partly defined by guiding elements that are arranged for abutment against the strip from opposite sides of the channel. At least one of the guiding elements is displaceable and biased towards the channel. In this device, the strip can be positioned with high-precision without being subjected to excessive frictional forces during the marking operation, to minimize interference with the motion of the strip.

15 Claims, 5 Drawing Sheets

U.S. PATENT DOCUMENTS

| | | | |
|---|---|---|---|
| 4,363,179 A | 12/1982 | Ruemer, Jr. et al. | 40/306 |
| 4,375,025 A | 2/1983 | Carlson | 219/121.68 |
| 4,380,129 A | 4/1983 | Barrash | 40/307 |
| 4,405,852 A | 9/1983 | Bononi | 219/121.69 |
| 4,431,124 A | 2/1984 | Campbell et al. | 226/15 |
| 4,459,910 A | 7/1984 | Taube | 101/18 |
| 4,476,781 A | 10/1984 | Kubacki et al. | 101/3.1 |
| 4,517,436 A | 5/1985 | Lawrence | 219/121.68 |
| 4,564,739 A | 1/1986 | Mattelin | 219/121.68 |
| 4,635,545 A | 1/1987 | Kubacki et al. | 101/4 |
| 4,675,500 A | 6/1987 | Kunz et al. | 219/121.73 |
| 4,765,532 A | 8/1988 | Uomoti et al. | 228/212 |
| 4,880,137 A | 11/1989 | Wells | 220/269 |
| 4,910,739 A | 3/1990 | Sheng | 372/19 |
| 5,202,199 A | 4/1993 | Mitzutani et al. | 429/176 |
| 5,206,496 A | 4/1993 | Clement et al. | 250/271 |
| 5,215,864 A | 6/1993 | Laakmann | 430/293 |
| 5,235,454 A | 8/1993 | Iwasaki | 359/198 |
| 5,248,878 A | 9/1993 | Ihara | 219/121.69 |
| 5,329,090 A | 7/1994 | Woelki et al. | 219/121.68 |
| 5,465,780 A | 11/1995 | Muntner et al. | 164/516 |
| 5,552,574 A | 9/1996 | Merlin | 219/121.69 |
| 5,570,384 A | 10/1996 | Nishida et al. | 372/19 |
| 5,578,120 A | 11/1996 | Takahashi et al. | 106/438 |
| 5,593,606 A | 1/1997 | Owen et al. | 219/121.71 |
| 5,649,363 A | 7/1997 | Rankin, VI | 29/896.9 |
| 5,653,900 A | 8/1997 | Clement et al. | 219/121.68 |
| 5,660,516 A | 8/1997 | Artrip | 413/14 |
| 5,660,747 A | 8/1997 | Drouillard et al. | 219/121.69 |
| 5,719,372 A | 2/1998 | Togari et al. | 219/121.61 |
| 5,782,024 A | 7/1998 | Pausch | 40/330 |
| 5,813,782 A * | 9/1998 | Mason | 400/636 |
| 5,817,243 A | 10/1998 | Shaffer | 216/65 |
| 5,854,805 A | 12/1998 | Reid | 372/70 |
| 6,002,098 A | 12/1999 | Pircher et al. | 219/121.64 |
| 6,080,958 A | 6/2000 | Miller et al. | 219/121.68 |
| 6,476,349 B1 * | 11/2002 | Jendick | 219/121.68 |

FOREIGN PATENT DOCUMENTS

| | | | | |
|---|---|---|---|---|
| DE | 89 00 453.1 | | 4/1989 | |
| DE | 38 22 097 A1 | | 1/1990 | |
| DE | 4106151 | | 11/1991 | |
| DE | 4143339 | | 3/1993 | |
| DE | 4339321 | | 6/1994 | |
| DE | 43 39 321 A1 | | 6/1994 | |
| DE | 4322252 | | 1/1995 | |
| DE | 44 35 531 A1 | | 4/1995 | |
| DE | 43 38 774 A1 | | 5/1995 | |
| DE | 44 05 203 A1 | | 8/1995 | |
| DE | 196 39 619 A1 | | 3/1997 | |
| DE | 19607621 | | 9/1997 | |
| DE | 296 16 109 U1 | | 11/1998 | |
| EP | 0 040 929 | | 12/1981 | |
| EP | 0 085 484 A1 | | 8/1983 | |
| EP | 0377915 A2 | | 7/1990 | |
| EP | 0482776 | | 4/1992 | |
| EP | 208 175 B1 | | 3/1993 | |
| EP | 0 618 037 A1 | | 10/1994 | |
| GB | 218563 | | 7/1987 | |
| JP | 58-187091 | | 11/1983 | |
| JP | 61086305 | | 5/1986 | |
| JP | 7-53099 A | | 2/1995 | |
| JP | 07053099 A | * | 2/1995 | B65H/23/038 |
| JP | 8-53121 | | 2/1996 | |
| JP | 09208095 A | * | 8/1997 | B65H/23/188 |
| WO | WO 93/04943 | | 3/1993 | |
| WO | WO 93/08541 | | 4/1993 | |
| WO | WO 95/04342 | | 2/1995 | |
| WO | WO 97/11288 | | 3/1997 | |
| WO | WO 98/53949 | | 12/1998 | |
| WO | WO 99/09853 | | 3/1999 | |
| WO | WO 00/03832 | | 1/2000 | |

OTHER PUBLICATIONS

Patent Abstracts of Japan, vol. 8, No. 25, E–225 Abstract of JP 58–187091A (Kanebo K.K.), Nov. 1, 1993.

Brochure entitled, "This is PLM Fosie," issued by Swedish Company, PLM Fosie AB (mid 1990's).

Abstract—JP 0080047784 AA.

Abstract—JP 0080053121 AA.

Abstract—AU 9481794 A.

Culkin & Kugler, "Industrial Laser Processing ", The Photonics Design & Applications Handbook, Book 3, 37th International Edition, 1991, pp. H–216227.

Dr. A.F.H. Kaplan, EuroLaser Academy, 1996/1997, Section "Laser Marking and Sribing", pp. 1–13.

W.M. Steen,"Laser Material Processing", Second Edition, Chapter "6.17. Laser Marking", Springer Verlag, 1998, pp. 263–265, 271.

* cited by examiner

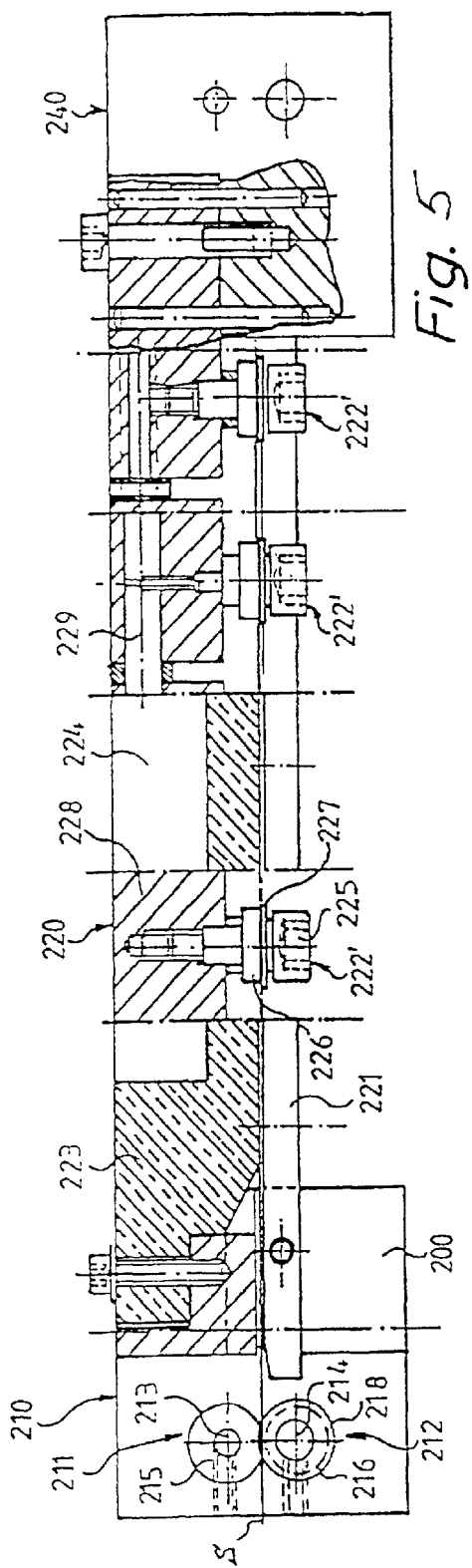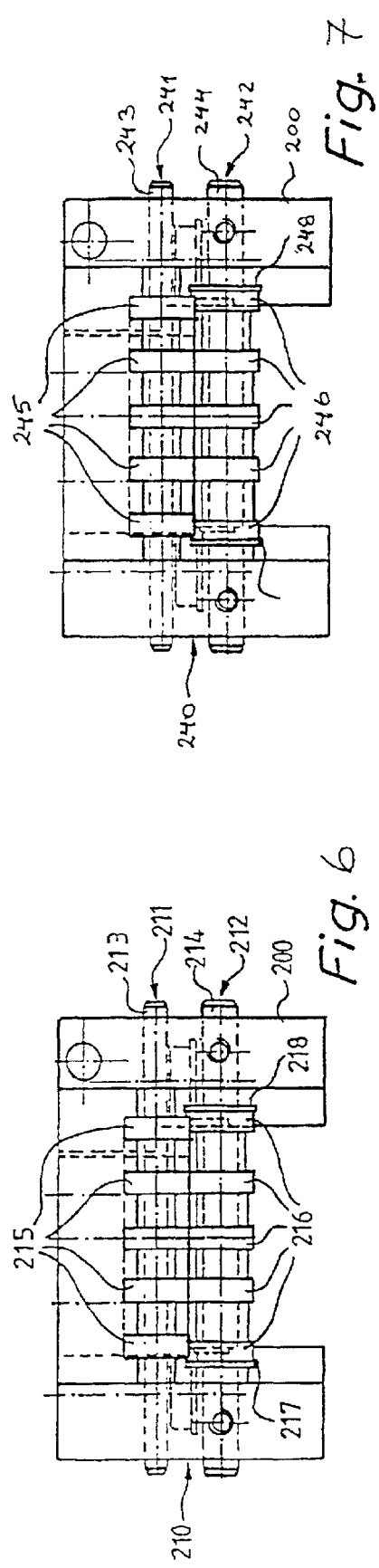

GUIDING DEVICE FOR A MARKING ARRANGEMENT

This application claims the benefit of U.S. provisional app. No. 60/176,925, filed Jan. 20, 2000.

TECHNICAL FIELD

The present invention relates to marking of a continuous strip or web, preferably of metal. More specifically, the invention relates to a device for guiding such a strip past a marking unit that is arranged to provide the strip with markings.

The present invention is especially useful in an arrangement for manufacture of marked articles to be included cans, in particular beverage cans. Therefore, the technical background of the invention, and objects and embodiments thereof, will be described with reference to such an arrangement. However, the invention may also be applicable in connection with marking of other articles formed from a continuous strip.

BACKGROUND ART

In many situations, there is a need for indicative markings on a product, for example, traceability markings indicating the origin of the product, or promotional markings. Such indicative markings can be provided by non-mechanical, i.e. non-contact, marking techniques, such as laser engraving or ink jet printing. These non-contact techniques provide for flexibility in production and high production speeds. Often, the markings must be precisely located in a specific area of the product. To this end, the marking equipment must be accurately controlled in providing the markings. Further, the material to be marked must be carefully positioned during the marking process. This is often inconsistent with high production speeds.

One area with a need for high production speeds is the beverage can industry, for example in the production of can ends. Typically, a production line for can ends has a capacity of 2,000 ends per minute. A conventional production line is disclosed in a brochure entitled "This is PLM Fosie" issued by Applicant's Swedish company PLM Fosie AB in the mid nineties. In a first production stage of such a production line, a thin metal strip, preferably a 0.23-mm-thick aluminium strip, is indexed into a tab forming unit in which the strip is punched and stamped to form opening tabs or opener rings integrated with the strip. In a second production stage, circular shells for forming the can ends are die cut from a thin metal sheet, preferably a 0.23-mm-thick aluminium sheet. Each shell is scored for opening, and a rivet for attachment of the tab is formed at the center of the shell. In a third production stage, the strip with the integrated tabs is joined with the circular shells in an attachment station, in which the tabs are separated from the strip and attached to the shells by riveting. A finished can end is achieved when the tab is fastened to the shell.

There is need for indicative markings on the tabs. Such markings could be provided by marking the strip before it is fed into the tab forming unit, in which the thus-marked strip is formed into marked tabs. However, due to the indexing motion of the strip into the tab forming unit, the strip will swing and jump in all directions on its way to the tab forming unit. Thus, to control the position of the strip, a guiding device should be arranged in the area of the marking operation. This guiding device should allow for careful positioning of the strip, but should not interfere with the intermittent progression of the strip into the tab forming unit. Also, stretching of the strip should be avoided, and friction should be minimized. Typically, the strip should be positioned with a precision of at least about 5–15 $\mu$m in the lateral, or transverse, direction, when providing markings on the surface of the tabs. The vertical position of the strip should also be carefully controlled within the focal region of marking equipment, typically with a precision of at least about 0.1–0.2 mm.

SUMMARY OF THE INVENTION

The object of the invention is to at least partly fulfil the above identified needs.

This object is achieved by a guiding device and an arrangement according to the appended independent claims. Preferred embodiments are defined in the dependent claims.

In the inventive device, by one or more guiding elements being pressed against the strip from at least one side of the channel, the strip can be positioned with high-precision without being subjected to excessive frictional forces during the marking operation. Thus, the inventive device does not significantly interfere with the motion of the strip.

According one preferred embodiment, the guiding element has a surface portion to be pressed against the strip, and a shoulder portion adjacent to the surface portion for guiding the strip in the channel. This guiding element performs the dual functions of applying stabilizing forces in the lateral or the vertical direction and guiding the strip in the longitudinal direction. Preferably, the surface portion and the shoulder are located on a freely rotatable body.

In a further preferred embodiment, the guiding elements are arranged to be pressed against the opposite longitudinal edges of the strip. This will minimize the bearing surfaces between the guiding elements and the strip, to further reduce friction. Preferably, each guiding element comprises a freely rotatable body having a cylindrical portion for abutment against the longitudinal edges, so that both friction and wear can be minimized. It is also preferred that the rotatable body comprises a circumferential shoulder adjacent to the cylindrical portion for guiding the strip in the channel. Preferably, the shoulder is arranged to guide a portion of one of the upper and lower surfaces adjacent to the longitudinal edges. This guiding element is compact and capable of controlling the position of the strip in both the vertical and the lateral direction.

In a further preferred embodiment, the guiding device comprises an intake and an outlet assembly, each including first and second intake rollers which receive the strip and abuttingly engage the upper and lower surfaces thereof, respectively. Such an assembly will isolate the strip portion in the channel from twisting and tugging motions in the strip fed to and from the guiding device.

BRIEF DESCRIPTION OF THE DRAWINGS

A presently preferred embodiment of the invention will now be described in more detail, reference being made to the accompanying schematic drawings.

FIG. 5 is a cross-sectional view taken along the line V—V in FIG. 4.

FIG. 6 is an end view taken in the direction of the arrows VI—VI in FIG. 4.

FIG. 7 is an end view taken in the direction of the arrows VII—VII in FIG. 4.

DESCRIPTION OF PREFERRED EMBODIMENTS

Figure 1:
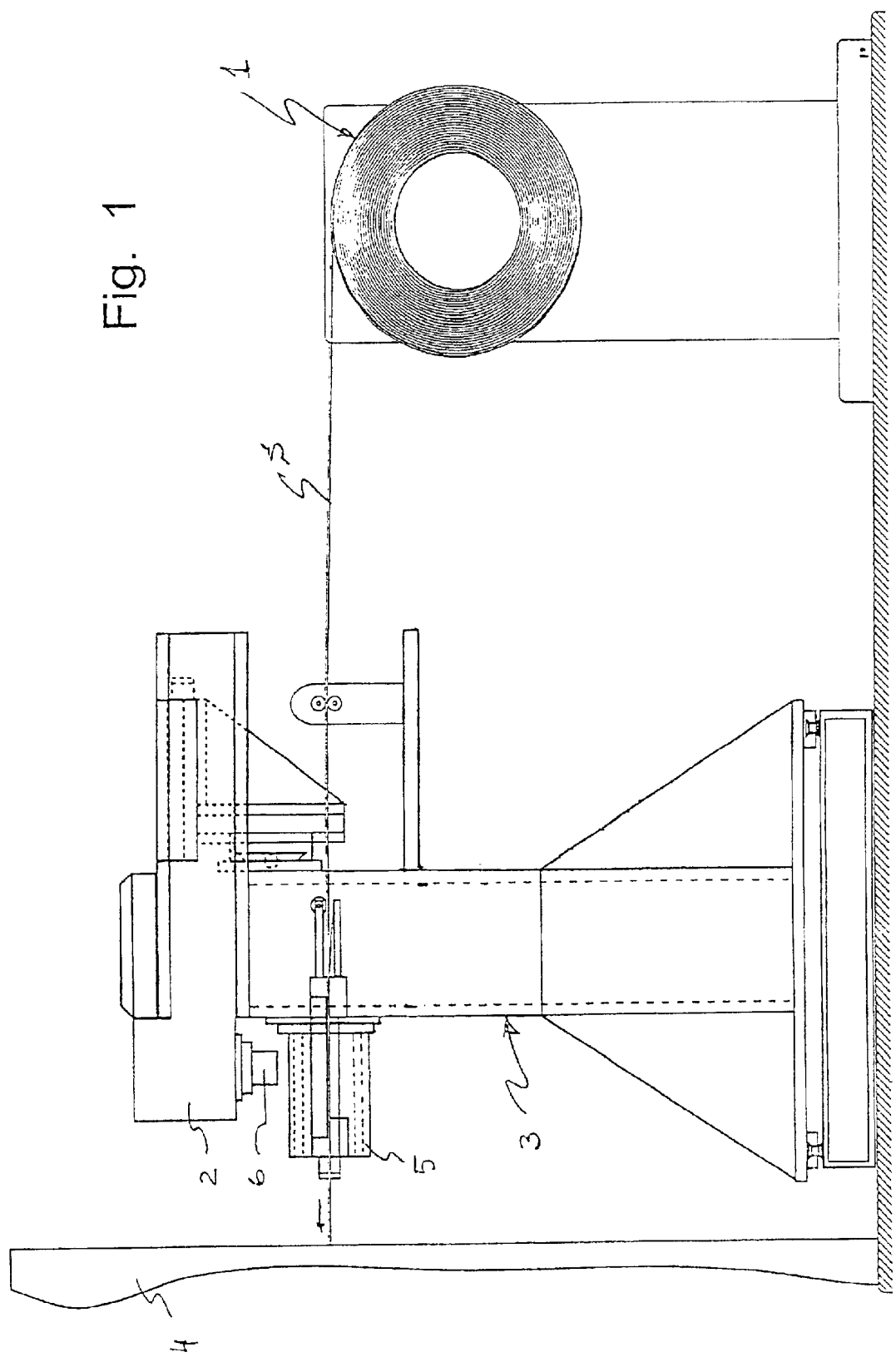
FIG. 1 is a side view of a laser engraving apparatus in a system for manufacturing opening tabs for can ends, the laser engraving apparatus including a guiding device according to the invention.

FIG. 1 shows part of an arrangement for manufacture of marked opener rings or tabs T (FIGS. 2–3) to be included in ends for beverage cans (not shown). A blank in the form of a thin, continuous metal strip S is fed from a supply 1 to a laser unit 2 supported by a supporting member 3. The laser unit 2 is of a high-power and high-speed type and is capable of providing laser engraved markings in the surface of the strip S. The laser unit 2 is adapted to generate laser radiation at a suitable wavelength, and to focus and direct the generated radiation to an engraving area on the surface of the strip S. After the engraving operation in the engraving area, the strip S is fed to an adjacent tab forming apparatus 4 which is of a type known per se and which forms tabs by punching and stamping the strip S. When passing the laser unit 2, the strip S is guided by a guiding unit 5 secured to the supporting member 3. Further, a dust protection device 6 is connected to the laser unit 2 to protect the laser unit 2 from dust or debris produced during the engraving operation.

Figure 2:
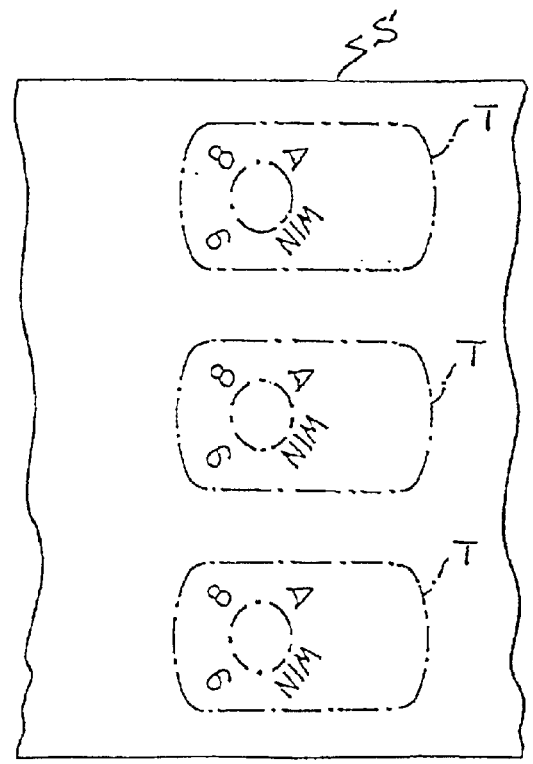
FIG. 2 is a plan view of a portion of a metal strip provided with indicative markings.
Figure 3:
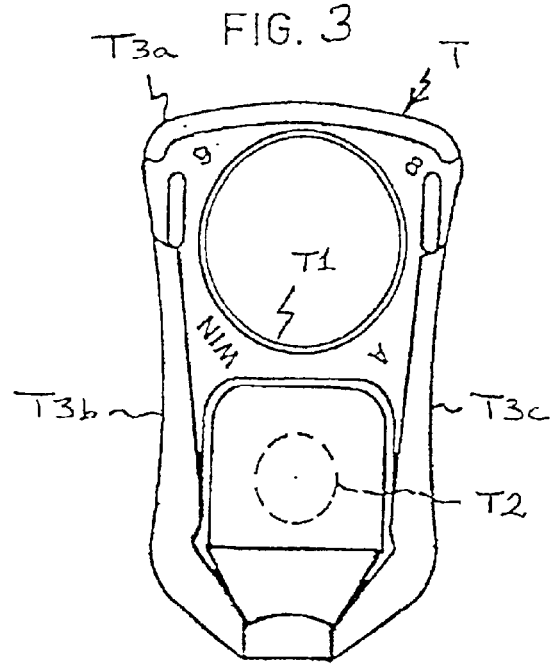
FIG. 3 is a bottom view of a tab having markings on its bottom surface.

FIG. 2 shows a portion of the strip S after the laser engraving operation at the laser unit 2, but before the punching and stamping operation in the tab forming apparatus 4. The laser unit 2 has provided the engraved markings WIN, A, 8, 9 on one surface of the strip S. The approximate periphery of the tab T to be produced in the following tab forming steps in the apparatus 4 has been indicated with ghost lines in FIG. 2. In practice, the size of the laser engraved markings is about 1.4×1.2 mm which makes them easily readable. In FIG. 3, the final tab T is shown from below after processing in the tab forming apparatus 4. The markings WIN, A, 9, 8 are now precisely located on a respective tab surface, in this case intermediate an opening T1 and peripheral edge portions T2, T3, T4 of the tab T.

FIGS. 4–7 shows in some detail a preferred embodiment of the strip guiding device 5. The device 5 comprises a main block 200, an intake mechanism 210, a guiding channel 220, and an outlet mechanism 240.

The intake mechanism 210 includes an upper and a lower intake roller 211, 212, each comprising a spindle 213, 214 having a number of cylindrical, laterally spaced radial projections 215, 216. The intake rollers 211, 212 are arranged to receive the strip S with the projections 215, 216 abuttingly engaging the upper and lower surfaces of the strip S, respectively. Each spindle 213, 214 is mounted in the main block 200 for free rotation therein. The clearance between the projections 215, 216 corresponds to the thickness of the strip S with nearly zero tolerance, in order to avoid a twisting motion of the incoming strip S being transmitted to the strip portion received in the guiding channel 220. The lower spindle 214 is provided with guiding shoulders 217, 218 with a mutual distance essentially corresponding to the width of the strip S, typically with a tolerance of about 0.5 mm.

In an alternative embodiment (not shown), the clearance between the projections 215, 216 is adjustable to accommodate strips of different thickness. Preferably, the upper intake roller 211 is adjustable in the vertical direction, while the lower intake roller 212 is fixed to remain level with the guiding path in the subsequent channel 220. The upper intake roller 211 could be adjusted by means of an eccentric mechanism (not shown) or be spring-biased towards the lower intake roller 212.

Returning to the embodiment of FIGS. 4–7, the guiding channel 220 is defined by a guiding shoe 221, a number of guiding elements 222, 222' arranged in pairs on both sides of the channel 220 in the longitudinal direction, and a guiding cover 223. The distance between the guiding shoe 221 and the guiding cover 223 is such that the strip can move essentially without interference. The guiding shoe 221 will guide the front end of the strip S in proper place on entering the intake mechanism 210. An opening or window 224 is defined in the cover 223 so that one surface of the strip S is accessible for engraving by means of the laser unit 2.

The guiding elements 222 on a first side of the channel 220 are mounted for rotation at a fixed location in the main block 220, whereas the guiding elements 222' on a second, opposite side of the channel 220 are mounted for both rotation and lateral displacement in the main block 200. Each guiding element 222, 222' comprises a rotatable guiding roller 225 which has a cylindrical portion with a circumferential surface 226 for abutment on the longitudinal edges of the strip S and an adjacent circumferential shoulder 227 for defining the guiding path of the strip S in the vertical direction. Thus, a small portion of the strip surface will be carried on the shoulders 227.

The displaceable guiding elements 222' further comprises a mounting block 228, which receives the guiding roller 225 and is displaceably arranged on a common 1 pin 229 extending in the longitudinal direction of the guiding device 5. Spring-biased pusher arrangements 230 are arranged to urge the guiding elements 222' towards the first side of the channel 220. Before the strip S enters the channel 220, the guiding elements 222' are pressed onto the guiding shoe 221, which has a slightly smaller width than the strip S. On entering the channel 220, the strip S will displace the guiding elements 222' against the biasing action of the pusher arrangements 230, thereby locating the strip S in the lateral direction. Typically, the mounting block 228 allows for a movement of ±3 mm in the lateral direction. As an alternative (not shown), all guiding elements 222, 222' can be displaceable and biased towards the center of the channel 220.

Figure 4:
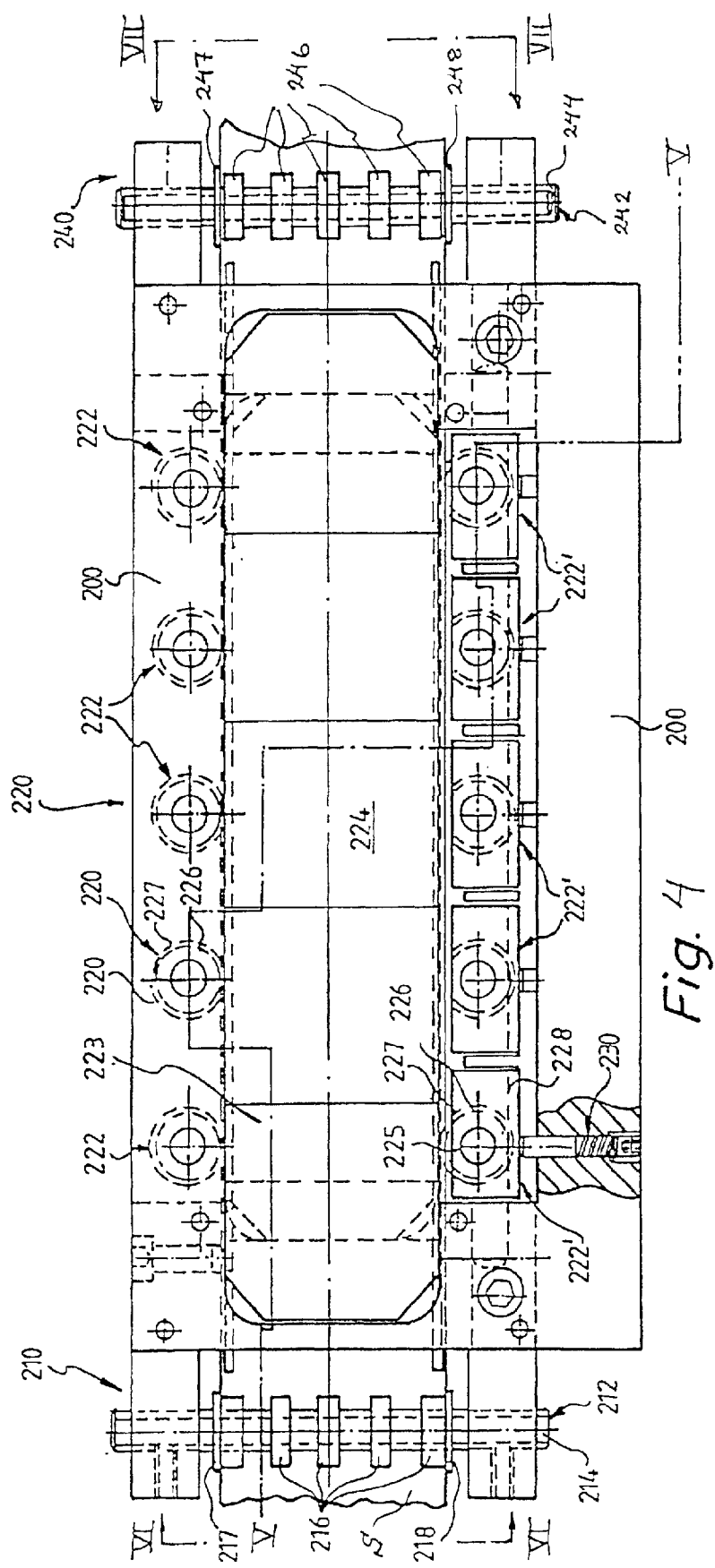
FIG. 4 is a plan view of a strip guiding device according to a preferred embodiment of the invention.

The components of the outlet mechanism 240 are illustrated in FIGS. 4, 5 and 7, and are identified by reference numerals 241–248 corresponding to reference numerals 211–218 of the identical intake mechanism 210. The above description of the intake mechanism 210 is equally applicable to the outlet mechanism 240 and will not be repeated.

The strip guiding device 5 as described above and shown in FIGS. 4–7 forms a self-adjusting system for careful positioning of the strip S during the laser engraving operation, independently of the subsequent tab forming unit 4. The strip S will move in a defined path through the guiding device 5, the path being delimited in the vertical direction by the guiding shoulders 227, and to some extent by the guiding shoe 221 and the guiding cover 223. In the lateral direction, the path is delimited by the circumferential surfaces 226 abutting against the longitudinal edges of the strip S. The intake and outlet mechanisms 210, 240 has the ability of precluding any twisting motion from being transferred to the strip portion in the marking area defined by the window 224.

In the illustrated preferred embodiment, the strip S is only subjected to guiding forces at its longitudinal edges.

Therefore, friction is minimal between the guiding device 5 and the strip S, and the indexing movement of the strip S is essentially undisturbed. In fact, tests show that the illustrated guiding device 5 improves the operation of the subsequent tab forming unit 4 by eliminating twitches and tugs in the strip S.

Friction in the guiding device 5 is also minimized by making the guiding elements 222, 222' freely rotatable, thereby eliminating any sliding friction between the strip S and the guiding elements 222, 222'. This also improves the service life of the device 5. Further, by applying the guiding forces on the longitudinal edges of the strip S, the area of the strip surface accessible for marking is maximized.

Figure 8A:
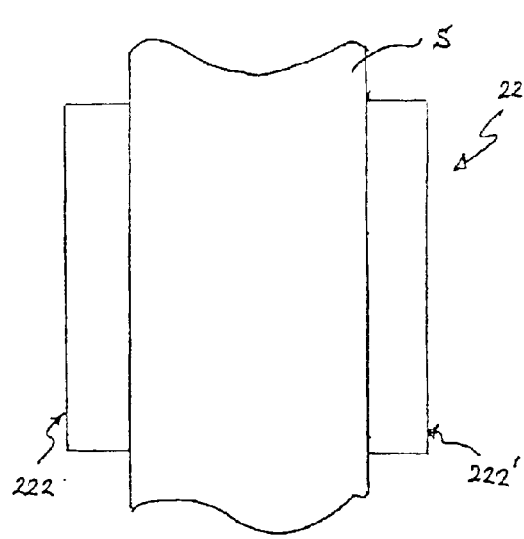
FIGS. 8a–8d illustrate alternative embodiments.

An alternative, simplified embodiment is shown in the plan view of FIG. 8*a*. Here, the guiding elements 222, 222' are provided in the form of blocks or wall portions. Either one, or both, of the guiding elements 222, 222' is displaceable and biased onto a longitudinal edge of the strip S. Although not shown on the drawing, each of the guiding elements 222, 222' is preferably provided with a guiding shoulder carrying the strip S in a defined path through the channel 220.

Figure 8B:
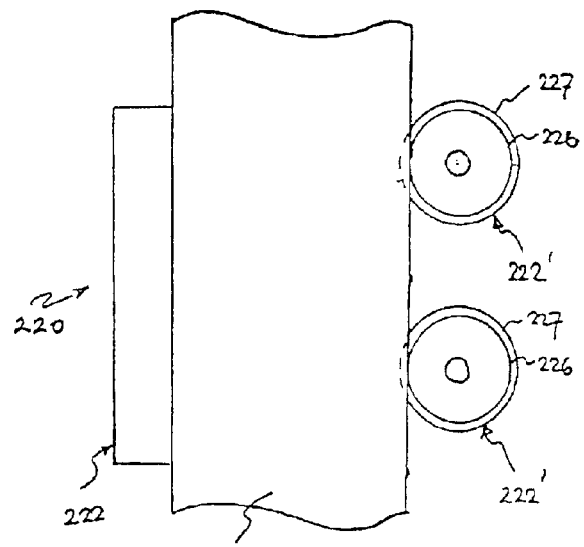
Figure 8C:
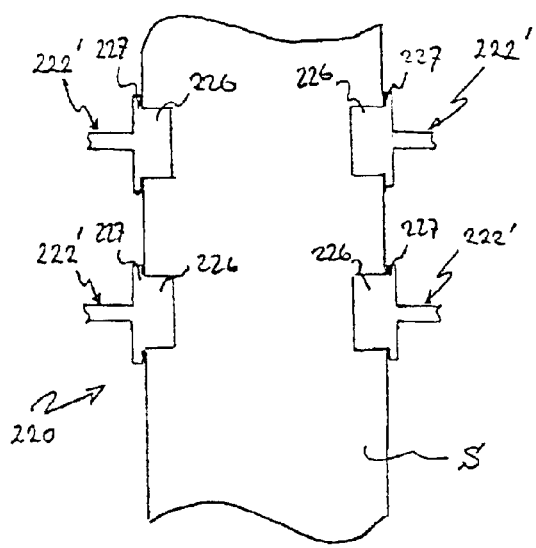

The plan view of FIG. 8*b* shows another alternative embodiment, which is a combination of the embodiment shown in FIGS. 4–7 and the one shown in FIG. 8*a*. Each of the guiding elements 222', and/or the guiding element 222, is biased to abut on a longitudinal edge of the strip S.

Figure 8D:
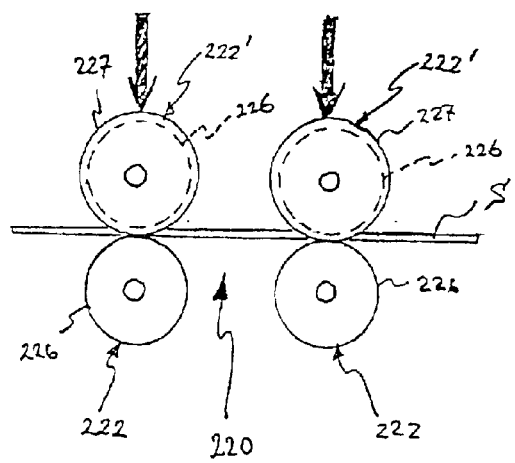

In a further alternative embodiment, shown in the plan view of FIG. 5*c* and the side view of FIG. 8*d*, guiding elements 222, 222' are arranged in pairs and biased (as indicated by arrows in FIG. 8*d*) to abut on the strip surface from opposite sides of the strip S in the channel 220. The guiding elements 222, 222' comprise a freely rotating body with a circumferential surface 226 for abutment on the surface of the strip S. One guiding element 222' in each pair has a guiding shoulder 227 adjacent to the surface 226. Thus, the surfaces 226 are pressed against the strip surface, thereby defining the path of the strip S in the vertical direction, whereas the shoulders 227 define the path in the longitudinal direction. Compared to the embodiment of FIGS. 4–7, the bearing surface of the guiding elements 222, 222' on the strip S is increased, and consequently friction is increased as well. Further, a larger portion of the strip surface will be blocked by the guiding elements 222, 222', thereby also reducing the strip surface accessible for marking.

Finally, it should be emphasized that the invention by no means is restricted to the embodiments described in the foregoing, and modifications are feasible within the scope of the appended claims. For example, to allow for marking of both sides of the strip S, the guiding shoe 221 could be substituted for a cover similar to the guiding cover 223.

Although the invention is described in connection to laser engraving equipment, it may also be applicable in connection with equipment for any other type of non-mechanical marking, such as ink jet printing.

What is claimed is:

1. A device for guiding a continuous strip past a marking unit, said strip having two opposite longitudinal edges, an upper surface and a lower surface, said marking unit being arranged to non-mechanically provide said strip with markings on at least one of said surfaces, said device comprising:
    a longitudinal channel that receives said strip, the channel being at least partly defined by guiding elements that are arranged for abutment against the strip from opposite sides of the channel, wherein at least one of the guiding elements is displaceable and biased towards the channel, wherein:
    each of said guiding elements comprises a freely rotatable body having a cylindrical portion for abutment against said opposite longitudinal edges of the strip, and
    at least a selected one of said guiding elements comprises a mounting block that receives at least one said rotatable body and is biased towards the channel.

2. A device as set forth in claim 1, wherein each said rotatable body further comprises a circumferential shoulder adjacent to said cylindrical portion for guiding said strip in said channel.

3. A device as set forth in claim 2, wherein each said shoulder is arranged to guide a portion of one of said upper and lower surfaces adjacent to said opposite longitudinal edges of the strip.

4. A device as set forth in claim 1, wherein each said mounting block is arranged for displacement on a common rod element extending in a longitudinal direction of the guiding device.

5. A device as set forth in claim 1, wherein the channel is further defined by at least one cover element that is arranged between the guiding elements to provide a small clearance with respect to a selected surface of said upper surface and said lower surface of the strip.

6. A device as set forth in claim 5, wherein the cover element defines an opening allowing the marking unit to provide markings on said selected surface.

7. A device as set forth in claim 1, further comprising two cover elements that are arranged to at least partly define said channel, a distance between the two cover elements being such that the strip can move essentially without interference in said channel.

8. A device as set forth in claim 7, wherein an opening is defined in at least one of said two cover elements allowing the marking unit to provide markings on at least one of said upper surface and said lower surface of the strip.

9. A device for guiding a continuous strip past a marking unit, said strip having two opposite longitudinal edges, an upper surface and a lower surface, said marking unit being arranged to non-mechanically provide said strip with markings on at least one of said surfaces, said device comprising:
    a longitudinal channel that receives said strip, the channel being at least partly defined by guiding elements that are arranged for abutment against the strip from opposite sides of the channel, wherein at least one of the guiding elements is displaceable and biased towards the channel, and
    an intake assembly that includes first and second intake rollers that are arranged to receive the strip and abuttingly engage the upper surface and the lower surface of the strip, respectively, wherein each of said first and second intake rollers is mounted in a supporting structure for free rotation therein.

10. A device as set forth in claim 9, wherein each of said first and second intake rollers comprises a spindle having cylindrical, laterally spaced radial projections, the projections being arranged to abuttingly engage the upper surface and the lower surface, respectively.

11. A device as set forth in claim 10, wherein one of said spindles is provided with guiding shoulders having a mutual distance that essentially corresponds to a distance between the opposite longitudinal edges of the strip.

12. A device, for guiding continuous strip past a marking unit, said strip having two opposite longitudinal edges, an upper surface and a lower surface, said marking unit being arranged to non-mechanically provide said strip with markings on at least one of said surfaces, said device comprising:
    a longitudinal channel that receives said strip, the channel being at least partly defined by guiding elements that are arranged for abutment against the strip from opposite sides of the channel, wherein at least one of the guiding elements is displaceable and biased towards the channel, and an outlet assembly that includes first and second outlet rollers that are arranged to receive the strip and abuttingly engage the upper surface and the lower surface thereof, respectively, wherein each of said first and second outlet rollers is mounted in a supporting structure for free rotation therein.

13. A device as set forth in claim 12, wherein each of said first and second outlet rollers comprises a spindle having cylindrical, laterally spaced radial projections, the projections being arranged to abuttingly engage the upper surface and the lower surface, respectively.

14. A device as set forth in claim 13, wherein one of said spindles is provided with guiding shoulders having a mutual distance that essentially corresponds to a distance between the longitudinal edges of the strip.

15. An arrangement for shaping and marking a continuous strip having an upper surface and a lower surface, said arrangement comprising:

a marking unit that non-mechanically provides said strip with markings said surfaces;

a processing apparatus that mechanically shapes the thus-marked strip into marked articles; and a guiding device including a longitudinal channel that receives said strip, the channel being at least partly defined by guiding elements that are arranged for abutment against the strip from opposite sides of the channel, wherein at least one of the guiding elements is displaceable and biased towards the channel.

* * * * *

UNITED STATES PATENT AND TRADEMARK OFFICE
CERTIFICATE OF CORRECTION

PATENT NO. : 6,926,456 B1
DATED : August 9, 2005
INVENTOR(S) : Jendick

It is certified that error appears in the above-identified patent and that said Letters Patent is hereby corrected as shown below:

Title page,
Item [56], References Cited, FOREIGN PATENT DOCUMENTS, insert
-- CA   2,232,871   03/1997 --.

Signed and Sealed this

Eleventh Day of October, 2005

JON W. DUDAS
*Director of the United States Patent and Trademark Office*